(12) United States Patent
Tiranno et al.

(10) Patent No.: US 9,989,290 B2
(45) Date of Patent: Jun. 5, 2018

(54) CONDENSER CONTROL SYSTEMS, DEVICES AND METHODS

(71) Applicant: Honeywell International Inc., Morristown, NJ (US)

(72) Inventors: Charles John Tiranno, Wadsworth, OH (US); Victor Lavrisiuk, Aurora, OH (US)

(73) Assignee: Honeywell International Inc., Morris Plains, NJ (US)

( * ) Notice: Subject to any disclaimer, the term of this patent is extended or adjusted under 35 U.S.C. 154(b) by 393 days.

(21) Appl. No.: 14/662,752

(22) Filed: Mar. 19, 2015

(65) Prior Publication Data
US 2016/0273814 A1   Sep. 22, 2016

(51) Int. Cl.
| F25B 49/00 | (2006.01) |
| F25D 21/02 | (2006.01) |
| G01K 13/00 | (2006.01) |
| F25B 49/02 | (2006.01) |
| F25B 6/02 | (2006.01) |
| F25B 5/02 | (2006.01) |

(52) U.S. Cl.
CPC ............. *F25B 49/027* (2013.01); *F25B 6/02* (2013.01); *F25B 5/02* (2013.01); *F25B 2400/0403* (2013.01); *F25B 2400/075* (2013.01); *F25B 2600/111* (2013.01); *F25B 2600/2503* (2013.01); *F25B 2600/2519* (2013.01); *F25B 2700/195* (2013.01); *F25B 2700/1931* (2013.01); *F25B 2700/2106* (2013.01); *Y02B 30/743* (2013.01)

(58) Field of Classification Search
CPC ............ F25B 49/027; F25B 2400/0403; F25B 2600/111; F25B 2600/2503; F25B 2700/192; F25B 2700/2106; F25B 2700/193
USPC .......................................... 62/126, 127, 129
See application file for complete search history.

(56) References Cited

U.S. PATENT DOCUMENTS

| 3,792,592 A | * | 2/1974 | Cook | F25B 49/027 62/158 |
| 2003/0066897 A1 | * | 4/2003 | Carner | G05D 23/1905 236/51 |
| 2011/0113795 A1 | * | 5/2011 | Montminy | B64F 1/364 62/77 |

(Continued)

FOREIGN PATENT DOCUMENTS

| JP | 2007017075 | 1/2007 |
| JP | 2007093117 | 4/2007 |
| WO | 2009045927 | 4/2009 |

*Primary Examiner* — Frantz Jules
*Assistant Examiner* — Daniel C Comings
(74) *Attorney, Agent, or Firm* — Brooks, Cameron & Huebsch, PLLC

(57) ABSTRACT

Condenser control, systems, devices, and methods are described herein. One system includes a number of pressure sensors, wherein each of the number of pressure sensors is configured to sense a pressure associated with a condenser of a refrigeration system, a temperature sensor configured to sense an outdoor air temperature, and a controller configured to activate operation of a number of condenser fans and a number of split valves associated with the condenser based, at least in part, on the sensed outdoor air temperature upon a failure of each of the number of pressure sensors.

20 Claims, 3 Drawing Sheets

(56) References Cited

U.S. PATENT DOCUMENTS

2012/0279243 A1* 11/2012 Endo ................. B60H 1/00921
  62/238.6
2013/0047639 A1* 2/2013 Stannard ............. B60H 1/3201
  62/79
2016/0116203 A1 4/2016 Tiranno et al.

* cited by examiner

CONDENSER CONTROL SYSTEMS, DEVICES AND METHODS

TECHNICAL FIELD

The present disclosure relates to condenser control, systems, devices, and methods in a refrigeration system.

BACKGROUND

A refrigeration system in a grocery store (e.g., display cases and/or walk-in coolers) may include a number of air-cooled condensers that cool down hot refrigerant vapor, which is discharged from a bank of compressors. The bank of fans can condense the refrigerant into a liquid form for distribution to the refrigerated cases and/or cold rooms.

In previous refrigeration systems, a condenser control can monitor discharge pressure readings from one or more pressure transducers in the refrigerant line from the bank of compressors. Further, the condenser control may attempt to maintain the pressure reading at a particular point (e.g., setpoint), which may be determined based on a capacity of the refrigerant condenser unit and/or the type of refrigerant utilized in the refrigeration system. That is, the cooling effect upon the hot refrigerant vapor can be influenced by the pressure reading associated with the capacity of the condenser unit. Accordingly, the pressure sensor reading may be a critical element for the proper and/or efficient operation of the condenser.

However, in some refrigeration systems, a pressure reading may not be available and/or obtainable due to a pressure sensor failure and/or errors. Without an alternative element reading, proper and/or efficient operation of the refrigeration condenser may not be possible.

DETAILED DESCRIPTION

Figure 1:
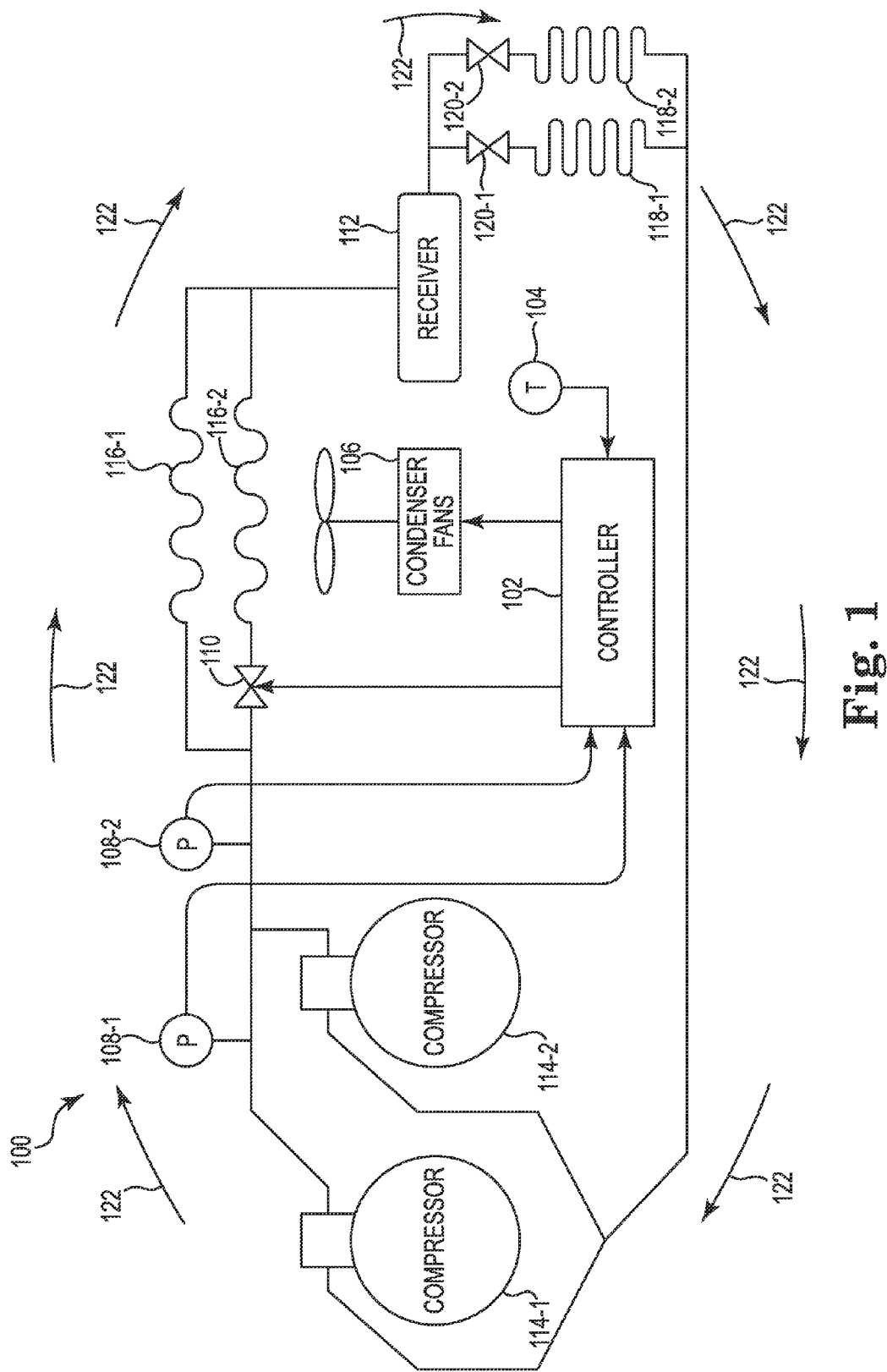
FIG. 1 illustrates an example of a condenser control system in accordance with one or more embodiments of the present disclosure.

Condenser control systems, devices, and methods in a refrigeration system are described herein. For example, one or more embodiments include a number of pressure sensors, wherein each of the number of pressure sensors is configured to sense a pressure associated with a condenser of a refrigeration system, a temperature sensor configured to sense an outdoor air temperature, and a controller configured to activate operation of a number of condenser fans and a number of split valves associated with the condenser based, at least in part, on the sensed outdoor air temperature upon a failure of each of the number of pressure sensors.

Condenser control systems, devices, and methods in accordance with the present disclosure can utilize a sensed pressure and/or an outdoor air temperature (OAT) sensor reading to support the proper and/or efficient operation of a refrigeration condenser. That is, condenser control embodiments of the present disclosure can use either a sensed pressure or an OAT to support and/or maintain the operation of an associated condenser. As used herein, a sensed pressure is a pressure reading of the refrigerant line from a bank of compressors sensed by a pressure sensor. The sensed pressure can serve as a control input to the condenser controller.

An OAT can be sensed by a temperature sensor, which can be used as a control input to the condenser controller. In the event of a pressure sensor failure (e.g., error, invalid readings, etc.), the OAT can be utilized to determine control functions associated with the condenser to maintain a required condensing capacity. In other words, the OAT can be utilized to determine an amount of cooling effect and/or actions upon the hot refrigerant vapor.

Further, condenser control systems, devices, and methods in accordance with the present disclosure enables condenser control to provide a controlled degradation of condensing capacity when the control inputs (e.g., sensed pressure, OAT) are unusable and enable the refrigeration system to continue functioning for a period of time.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of pressure sensors" can refer to one or more pressure sensors.

FIG. 1 illustrates an example of a condenser control system 100 in accordance with one or more embodiments of the present disclosure. The condenser control system 100 can be associated with a refrigeration system of, for example, a grocery store.

A refrigeration system associated with the condenser control system 100 can include various components. For instance, a refrigeration system may include a number of compressors 114-1, 114-2 (generally referred to as 114) that can constrict refrigerant vapor (e.g., gas), which increases the pressure of a refrigerant vapor. Although two compressors are shown in the example illustrated in FIG. 1, embodiments of the present disclosure are not limited to a particular number of compressors.

A pressure sensor 108 can sense the pressure of the refrigerant vapor. As illustrated in FIG. 1, condenser control system 100 can include a number of pressure sensors 108-1, 108-2 (generally referred to as 108). Although two pressure sensors are shown in FIG. 1, embodiments of the present disclosure are not limited to a particular number of sensors. Each of the number of pressure sensors 108-1, 108-2 can sense (e.g., detect) a pressure of a liquid and/or a gas associated with a condenser that includes a set of coils (e.g., 116-1, 116-2, generally referred to as 116) within a refrigeration system. In other words, the pressure sensors 108-1, 108-2 can sense the vapor pressure from the compressor 114. For example, pressure sensor 108-1 can sense the vapor pressure from compressor 114-1 and/or 114-2.

The number of pressure sensors 108-1, 108-2 can be pressure transducers that generate a signal as a function of the pressure imposed. That is, the pressure sensors 108-1, 108-2 can detect a fluid and/or a gas pressure and produce an electrical, mechanical, or pneumatic signal related to the pressure.

In some embodiments, the sensed pressure (e.g., reading, signal) can be sensed by a single pressure sensor 108-1 or 108-2 (e.g., a single discharge pressure transducer). In some embodiments, the sensed pressure can be sensed by multiple pressure sensors 108-1, 108-2 (e.g., multiple discharge pressure transducers) and the condenser control may use the single highest sensed pressure (e.g., greatest sensed pressure reading). If one pressure sensor 108 fails, the remaining pressure sensors 108 can continue to provide a sensed pressure, thereby maintaining condenser control.

As the compressor 114 constricts the refrigerant vapor (e.g., gas), the vapor pressure increases, and the vapor can be pushed into coils 116. The coils 116 (e.g., 116-1, 116-2), in some examples, may be located on the outside of the refrigeration system. The coils can be a part of the condenser. The coils 116 can serve to cool the hot vapor (e.g., gas). For instance, when the hot vapor (e.g., gas) in the coils 116 meets the coils with a cooler OAT (e.g., outside of the refrigerator), the hot vapor transforms into a liquid (e.g., refrigerant).

As shown in FIG. 1, the condenser control system 100 can include a temperature sensor 104. The temperature sensor 104 can sense the Outdoor Air Temperature (OAT). An OAT is the temperature outside of the refrigeration system or the temperature flowing through the coils 116 (e.g., 116-1, 116-2). For example, the outside air temperature can be room temperature. The cooling liquid formed at high pressure at the coil 116 can continue to cool (e.g., decrease in temperature) as it flows through the coils 116.

As shown in FIG. 1, the condenser control system 100 can include a controller 102. The pressure sensor 108 and/or the temperature sensor 104 can transmit a sensed pressure and/or an OAT, respectively, to the controller 102. In some examples, the controller 102 can validate the sensed OAT.

In some embodiments of the present disclosure, the controller 102 can activate operation of a number of condenser fans 106 and/or a number of split valves 110 associated with the condenser (e.g., 116) based, at least in part, on the sensed OAT upon a failure of each of the number of pressure sensors 108 (e.g., 108-1, 108-2). That is, if number of pressure sensor 108 can experience failure, the sensed OAT can be used as a control input.

As used herein, the number of split valves 110 decrease a surface area in the condenser (e.g., 116), which in turn, can decrease cooling of the vapor and/or cooling liquid.

The controller 102, in some embodiments, can activate operation of a first portion of the number of condenser fans 106 upon the sensed OAT meeting or exceeding a first (OAT) threshold value and upon a failure of each of the number of pressure sensors 108 (e.g., 108-1, 108-2). Additionally, or alternatively, the controller 102 can activate operation of a second portion of the number of condenser fans 106 upon the sensed OAT meeting or exceeding a second OAT threshold value and upon a failure of each of the number of pressure sensors 108.

Additionally, or alternatively, the controller 102 can activate operation of a third portion of the number of condenser fans 106 upon the sensed OAT meeting or exceeding a third OAT threshold value and/or upon a failure of each of the number of pressure sensors 108.

For example, the pressure sensors 108 may experience a failure (e.g., fault, error, etc.). The temperature sensor 104 can sense an OAT (e.g., reading) and provide the sensed OAT to the controller. Based on the sensed OAT, the controller can activate operation of a first, second, or third portion of the condenser fans such that the vapor and/or cooling liquid within the coils 116 (e.g., 116-1, 116-2) can be cooled into a liquid so that the rest of the system can maintain refrigeration.

In some instances, the first portion of the number of condenser fans 106 can include a greater number of actuated condenser fans than the second portion of the number of condenser fans 106. For instance, the first portion can have an increased amount (e.g., number) of actuated operated numbered condenser fans than compared to the second portion. An increased number of actuated condenser fans can increase cooling due to, in some instances, increased air circulation.

In some embodiments of the present disclosure, the condenser control system 100 can include a number of split valves 110. The split valve 110 can enable or disable flow through the number of condenser coils 116. The controller 102 can de-energize (e.g., enable) the split valve 110 upon the sensed OAT meeting or exceeding the first OAT threshold value. In other words, de-energization of the split valve 110 can support fluid flow (e.g., refrigerant) through the plurality of condenser coils 116. De-energization of the split valve 110 can increase fluid flow and increase cooling.

Additionally, or alternatively, the controller 102 can energize (e.g., disable) the split valve 110 upon the sensed OAT meeting or exceeding the second OAT threshold value. Energization of the split valve 110 can activate a piston within the split valve to inhibit fluid flow through the plurality of split valves 110. Energization may prevent the unnecessary cooling and/or waste of resources.

In some embodiments in accordance with the present disclosure, absent a sensed OAT, the controller 102 can include a bypass mode. The controller 102 can initiate the bypass mode upon the failure of each of the number of pressure sensors 108 (e.g., 108-1, 108-2) and/or temperature sensor 104. The bypass mode can modify a capacity of the condenser (e.g., 116) by activating a portion (e.g., all) of the number of condenser fans 106 and de-energizing split valves 110. That is, if the pressure sensors 108 and the temperature sensors 104 experience failure (e.g., unable to sense a pressure or OAT, respectively), the controller can activate a portion of the number of condenser fans and de-energize the number of split valves as a form of condenser control. Additionally, or alternatively, a validated sensed OAT can terminate the bypass mode and condenser control can proceed as described above.

The cooling liquid can flow through the coils 116 located in the condenser. The cooling liquid (e.g., refrigerant) can be stored in a receiver 112. The cooling liquid can absorb the heat inside the refrigerated cases and/or cold room. The cooling liquid flows into expansion valves 120 (e.g., 120-1, 120-2, generally referred to as 120) and evaporator coils 118-1, 118-2 (e.g., generally referred to as 118) and evaporates into vapor (e.g., gas), cooling the air inside the refrigerated cases and/or cold rooms. The vapor can return to the compressor 114. A flow 122 depicted as arrow illustrated in FIG. 1, indicates the cycle can repeat for condenser control and/or controlled condenser degradation.

Figure 2:
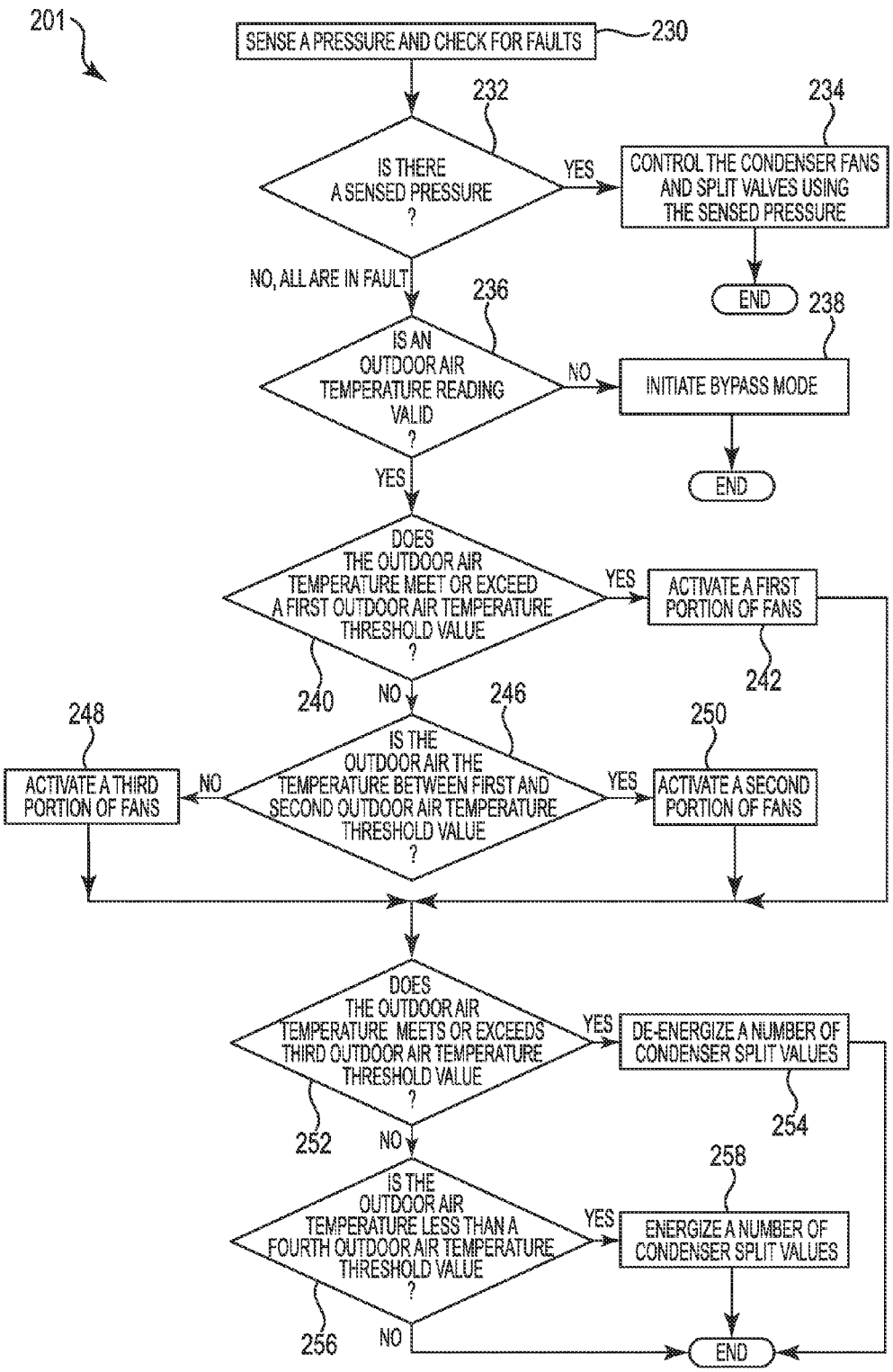
FIG. 2 illustrates an example flow diagram for performing a method for condenser control in accordance with one or more embodiments of the present disclosure.

FIG. 2 illustrates an example flow diagram for performing a method 201 for condenser control in accordance in one or more embodiments of the present disclosure. Method 201 can be performed by, for example, condenser control system 100 described in connection with FIG. 1.

At block 230, the method 201 can include a sensing (e.g., by sensors 108-1, 108-2, described in connection with FIG. 1) pressure associated with a condenser system and checking the pressure sensors for faults. At block 232, the method 201 can include determining whether there is a sensed pressure that can be used as a control input for a controller (e.g., 102 in FIG. 1) associated with a refrigeration circuit.

A sensed pressure that can be used as a control input is a pressure sensed by at least one pressure sensor among a plurality of pressure sensors that is not in fault (e.g., failure, error, etc.) and can sense pressure (e.g., reading). In some embodiments, if at least one pressure sensor can sense pressure and is not in fault, a number of condenser fans (e.g., 106 in FIG. 1) and split valves (e.g., 110 in FIG. 1) can be controlled using the sensed pressure at block 234. In other words, the controller can operate condenser control utilizing the sensed pressure.

Additionally, or alternatively, the controller can detect a failure of a number of pressure sensors for a condenser associated with a refrigeration circuit. For example, if each of the pressure sensors are in fault, and thus a sensed pressure is unreliable, method 201 may proceed to block 236, and an OAT may be utilized by the controller to generate condenser control.

At block 236, method 201 can include determining whether an OAT (e.g., reading) is valid. For example, a temperature sensor (e.g., 104 in FIG. 1) can sense an OAT and, upon determining validity, provide the sensed OAT as a control input to the controller.

If the OAT is invalid, at block 238, method 201 can include initiating (e.g., by the controller) a bypass mode. In some embodiments, the bypass mode can activate operation of each of the number of condenser fans and de-energize (e.g., turn off) the split valves, such that a maximum condensing capacity is initiated. That is, in the event of pressure sensor and temperature sensor failure, the controller can initiate the bypass mode to induce maximum condensing capacity and/or control condenser degradation. The bypass mode may be initiated when the OAT is not valid, however, the bypass mode can be terminated upon validating the OAT.

If the OAT is valid, at block 240, method 201 can determine whether the OAT meets or exceeds a first outdoor temperature threshold value. If yes, a first portion of condenser fans can be activated at block 242 of method 201. For example, if the OAT meets or exceeds 60 degrees Fahrenheit, then each and/or all condenser fans can be activated.

Additionally, or alternatively, if the OAT does not meet or exceed the first OAT threshold value, the method 201 can proceed to block 246. For example, the OAT may be 50 degrees, which does not meet or exceed 60 degrees.

At block 246, method 201 can include determining whether the OAT is between the first OAT threshold value and a second OAT threshold value. If yes, then a second portion of condenser fans can be activated at block 250 of method 201. If no, then a third portion of condenser fans may be activated at block 248 of method 201. For example, whether the OAT is between 45 degrees and 60 degrees can be determined. If yes (e.g., the OAT is 50 degrees), then 75 percent of the condenser fans may be activated. Alternatively, if no (e.g., the OAT is 30 degrees), then 50% of the fans can be activated. In some examples, the colder (e.g., decreased) the temperature, the less condenser fans activated.

Associated with condenser control, in some embodiments, are condenser split valves. The condenser split valve states can be instigated based on the OAT exceeding a first, second, and/or a third OAT threshold value, in various embodiments of the present disclosure. That, the condenser split valve state can be dependent upon the OAT value.

At block 252, the method 201 can include determining whether the outdoor temperature meets or exceeds a third OAT threshold value. If yes, the condenser split valve state can be instigated to de-energize the number of condenser split valves and/or support fluid (e.g., refrigerant) flowing to the condenser at block 254. For example, if the OAT is meets or exceeds 35 degrees Fahrenheit, each split valve can be de-energized (e.g., turned off).

Additionally or alternatively, if the OAT does not meet or exceed the fourth threshold value (e.g., 30 degrees) at block 256 of method 201, a second condenser split valve state can be instigated to energize the number of condenser split valves and/or inhibit fluid flowing to the condenser at block 258.

In some examples, the method 201 can include sensing an additional OAT. For example, the temperature sensor can sense failure of the first OAT sensor and perform herein listed control with the additional OAT and the condenser control can operate accordingly. In other words, condenser control actions can be changed based on a remaining functional OAT. For example, drastic temperature changes, such as an increase from 30 degrees to 65 degrees, can change the activated number of condenser fans and instigated split valves. The number of condenser split valve states and the activated number of condenser fans influence degradation of a condensing capacity associated with the condenser.

Figure 3:
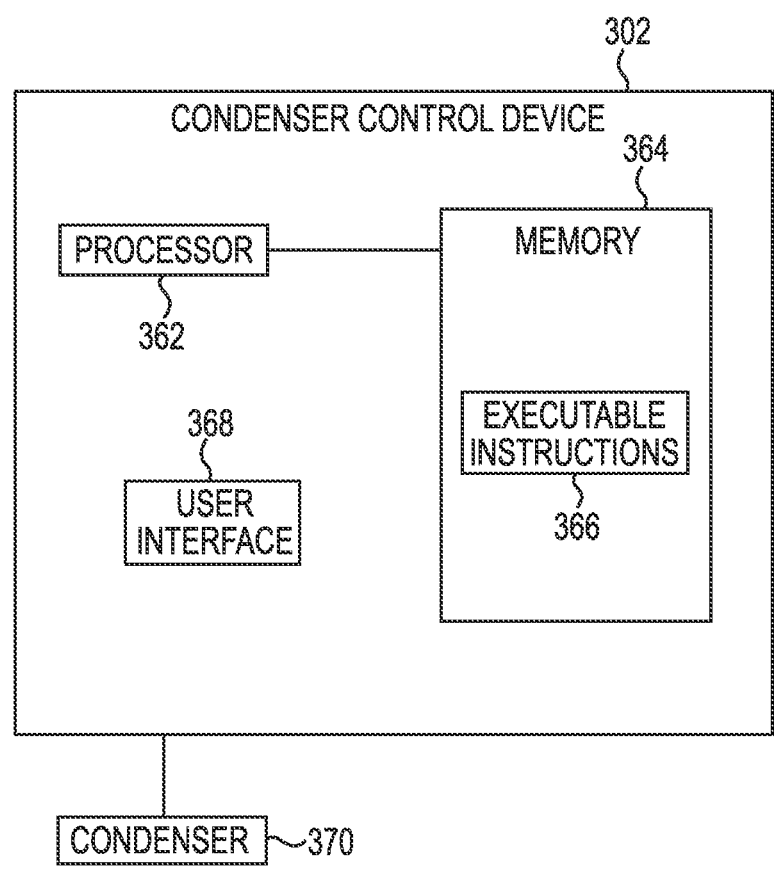
FIG. 3 illustrates an example of a condenser control device in accordance with one or more embodiments of the present disclosure.

FIG. 3 illustrates an example of a condenser control device 302 in accordance with one or more embodiments of the present disclosure.

Condenser control device 302 can be for example, controller 102 described in connection with FIG. 1. The condenser control device 302 can be, for example, a laptop computer, desktop computer, or mobile device (e.g., smart phone, tablet, PDA, etc.), among other types of computing devices. In some embodiments, condenser control device 302 can be a central controller for a refrigeration system. For example, condenser control device 302 can be an off-site, enterprise management computer.

As shown in FIG. 3, condenser control device 302 can include a memory 364 and a processor 362. Memory 364 can be any type of storage medium that can be accessed by processor 362 to perform various examples of the present disclosure. For example, memory 364 can be a non-transitory computer readable medium having computer readable instructions (e.g., computer program instructions) stored thereon that are executable by processor 362 to perform various examples of the present disclosure. That is, processor 362 can execute the executable instructions 366 stored in memory 364 to perform various examples of the present disclosure. For example, the processor can be configured to execute the instructions to track the activated operation of the number of condenser fans for a particular amount of time, as previously discussed in relation to FIGS. 1 and 2.

Memory 364 can be volatile or nonvolatile memory. Memory 364 can also be removable (e.g., portable) memory, or non-removable (e.g., internal) memory. For example, memory 364 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 364 is illustrated as being located in the condenser control device 302, embodiments of the present disclosure are not so limited. For example, memory 364 can also be located internal to another computing resource (e.g., enabling computer readable instructions to be downloaded over the Internet or another wired or wireless connection).

In some embodiments, the condenser control device 302 can include a user interface 368. A user of condenser control device 302, such as, for instance, an operator or configuration engineer of a refrigeration control system (FIG. 1, 100), can interact with condenser control device 302 via the user interface 368. For example, the user interface can provide (e.g., display and/or present) information to the user of condenser control device 302, and/or receive information from (e.g., input by) the user of condenser control device 302. For instance, in some embodiments, user interface can be a graphical user interface (GUI) that can include a display (e.g., a condenser overview screen) that can provide and/or receive information, such as the activated number of condenser fans associated with the condenser during a particular time, to and/or from the user of condenser control device 302.

The display can be, for instance, a touch-screen (e.g., the GUI can include touch-screen capabilities). In some embodiments, the display can depict a status and/or a mode associated with the degradation of the condensing capacity. A numerical value representing the number of the condenser fans 106 activated at a particular time may be presented. That is, the display can indicate the number of actuated condenser fans in operation and/or the number of split valves energized and/or de-energized.

As an additional example, user interface can include a keyboard and/or mouse the user can use to input information into condenser control device 302. Embodiments of the present disclosure, however, are not limited to a particular type(s) of user interface.

In some embodiments, the condenser control device 302 can be central controller that controls (e.g., regulates) the condenser 370, among other functions. As shown in FIG. 3, the condenser control device 302 can be connected (e.g., communicatively coupled) to the condenser 370 via a link (e.g., connection, communication link).

Such a connection can allow sensed pressure and/or OAT to be sent in any direction between the condenser control device 302 and the condenser 370, as well as between condenser 370 and the condenser control device 302. For example, the condenser control device 302 can receive, from a number of pressure sensors, a pressure associated with the condenser 370 of a refrigeration system. Additionally, in some examples, the condenser control device 302 can receive from a temperature sensor, an outdoor air temperature.

In some embodiments, the condenser control device 302 (e.g., controller) can activate operation of a number of condenser fans and a number of split valve states associated with the condenser 370 based on, at least in part, on the sensed outdoor temperature upon a failure of each of the number of pressure sensors. The activated operation of the number of condenser fans and/or the number of split valve states can be configured to influence degradation of a condensing capacity associated with the condenser.

The condenser control device 302 (e.g., controller) can function using one or more different types of technology. In some embodiments, the condenser control device 302 can be and/or include a computing device configured to execute instructions instead of, or in addition to, logic. In such embodiments, the executable instructions can be stored in a storage location, such as flash or hard disk memory located within the controller or in an external location. For example, the condenser control device 302 can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

As illustrated in FIG. 3, the condenser control device 302 can be connected to temperature sensor (e.g., 104 in FIG. 1) and be coupled to condenser fans (e.g., 106 in FIG. 1). The condenser control device 302 can utilize these connections to initiate a bypass mode when the OAT cannot be validated, where the bypass mode can include activation of the plurality of condenser fans and instigate a de-energized condenser split valve state, as previously discussed in relation to FIGS. 1 and 2.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:
1. A condenser control system, comprising:
    a number of pressure sensors, wherein the number of pressure sensors are configured to sense a pressure associated with a condenser of a refrigeration system;
    a temperature sensor configured to sense an outdoor air temperature; and
    a controller configured to:

activate operation of a number of condenser fans and a number of split valves associated with the condenser based directly on the sensed outdoor air temperature upon a failure of all of the number of pressure sensors; and initiate a bypass mode to induce maximum condensing capacity upon a failure of the temperature sensor.

2. The condenser control system of claim 1, wherein the controller is configured to;

activate operation of a first portion of the number of condenser fans upon the sensed outdoor air temperature meeting or exceeding a first outdoor air temperature threshold value and upon a failure of the number of pressure sensors; and activate operation of a second portion of the number of condenser fans upon the sensed outdoor air temperature meeting or exceeding a second outdoor air temperature threshold value and upon a failure of the number of pressure sensors.

3. The condenser control system of claim 2, wherein the controller is further configured to:

de-energize the number of split valves upon the sensed outdoor air temperature meeting or exceeding the first outdoor air temperature threshold value; and energize the number of split valves upon the sensed outdoor air temperature meeting or exceeding the second outdoor air temperature threshold value.

4. The condenser control system of claim 3, wherein the de-energization of the number of split valves support fluid flow through a plurality of condenser coils.

5. The condenser control system of claim 3, wherein the energization of the number of split valves activates a piston to inhibit fluid flow through the number of split valves.

6. The condenser control system of claim 2, wherein the first portion of the number of condenser fans includes a greater number of the condenser fans than the second portion of the number of condenser fans.

7. The condenser control system of claim 1, wherein the bypass mode is configured to activate a portion of the number of condenser fans and de-energizing the number of split valves.

8. The condenser control system of claim 7, wherein a validated sensed outdoor air temperature terminates the bypass mode.

9. The condenser control system of claim 1, wherein the controller is configured to validate the sensed outdoor air temperature.

10. The condenser control system of claim 1, wherein the controller is configured to display a numerical value representing the number of the condenser fans activated at a particular time.

11. A condenser control device, comprising:
a memory; and
a processor configured to execute executable instructions stored in the memory to:
receive, from a number of pressure sensors, a pressure associated with a condenser of a refrigeration system;
receive, from a temperature sensor, an outdoor air temperature;
activate operation of a number of condenser fans and a number of split valve states associated with the condenser based directly on the sensed outdoor temperature upon a failure of each of the number of pressure sensors, wherein the activated operation of the number of condenser fans and the number of split valve states is configured to influence degradation of a condensing capacity associated with the condenser; and initiate a bypass mode to induce maximum condensing capacity upon a failure of the temperature sensor.

12. The condenser control device of claim 11, wherein the processor is configured to execute the instructions to initiate the bypass mode when the outdoor air temperature cannot be validated, wherein the bypass mode includes activation of the plurality of condenser fans and instigate a de-energized condenser split valve state.

13. The condenser control device of claim 11, wherein the processor is configured to execute the instructions to display a numerical value representing the number of condenser fans activated during a particular period of time.

14. The condenser control device of claim 11, wherein the processor is configured to execute the instructions to display a status and a mode associated with the degradation of the condensing capacity.

15. A method for condenser control, comprising:
detecting a failure of a number of pressure sensors for a condenser associated with a refrigeration system;
sensing an outdoor air temperature via a temperature sensor;
activating, based directly on the outdoor air temperature and upon detecting the failure of the number of pressure sensors, a portion of a number of condenser fans associated with the condenser;
instigating, based directly on the outdoor air temperature and upon detecting the failure of the number of pressure sensors, a number of condenser split valve states to control refrigerant flowing to the condenser, wherein the number of condenser split valve states and the activated number of condenser fans influence degradation of a condensing capacity associated with the condenser; and
initiating a bypass mode to induce maximum condensing capacity upon a failure of the temperature sensor.

16. The method of claim 15, wherein the number of condenser split valve states include:
a first condenser split valve state to de-energize the number of condenser split valves and support refrigerant flowing to the condenser; and
a second condenser split valve state to energize the number of condenser split valves and inhibit refrigerant flowing to the condenser.

17. The method of claim 16, wherein the method includes:
sensing an additional outdoor air temperature;
activating, based on the additional outdoor air temperature, an additional portion of the number of condenser fans; and
instigating, based on the additional outdoor air temperature, an additional condenser split valve state.

18. The method of claim 15, further comprising initiating the bypass mode when the outdoor air temperature is not valid, wherein initiating the bypass mode includes activating the number of condenser fans and de-energizing the condenser split valve to prolong capacity of the condenser.

19. The method of claim 15, wherein the number of condenser split valve states initiated is based on the outdoor air temperature exceeding a first or second outdoor air temperature threshold values.

20. The method of claim 15, further comprising initiating the bypass mode when the outdoor air temperature is not valid, wherein the bypass mode is terminated upon validating the outdoor air temperature.

* * * * *